United States Patent [19]
Boehm et al.

[11] Patent Number: 4,460,534
[45] Date of Patent: Jul. 17, 1984

[54] TWO-SHOT INJECTION MOLDING

[75] Inventors: Russell W. Boehm; William R. Keelen, both of Boulder County, Colo.; Herbert Rees, Dufferin County, Canada

[73] Assignee: International Business Machines Corporation, Armonk, N.Y.

[21] Appl. No.: 415,771

[22] Filed: Sep. 7, 1982

[51] Int. Cl.³ .......................... B29C 7/00; B29D 9/00; B29F 1/12
[52] U.S. Cl. .................................. 264/246; 264/250; 264/268; 264/269; 264/334
[58] Field of Search ............... 264/161, 163, 245, 246, 264/247, 250, 255, 334, 513, 241, 267–269; 425/556, 557, DIG. 34

[56] References Cited
U.S. PATENT DOCUMENTS

| | | | |
|---|---|---|---|
| 2,333,059 | 10/1943 | Tucker | 264/161 |
| 2,510,091 | 6/1950 | Dofsen et al. | 264/161 |
| 2,544,140 | 3/1951 | Dofsen et al. | 264/161 |
| 2,544,140 | 3/1951 | Dofsen et al. | 18/59 |
| 2,663,910 | 12/1953 | Danielson et al. | 18/59 |
| 2,765,555 | 10/1956 | Gits et al. | 40/130 |
| 3,031,722 | 5/1962 | Gits | 18/59 |
| 3,164,864 | 1/1965 | Kobayashi | 18/42 |
| 3,173,176 | 3/1965 | Kobayashi | 18/30 |
| 3,178,497 | 4/1965 | Moscicki | 264/245 |
| 3,354,249 | 11/1967 | Morin | 264/161 |
| 4,165,959 | 8/1979 | Dechavanne | 425/130 |
| 4,309,380 | 1/1982 | Sauer | 264/513 |

Primary Examiner—Willard E. Hoag
Attorney, Agent, or Firm—Francis A. Sirr

[57] ABSTRACT

The complete, two-color, multiple keybutton array of a keyboard is molded by a two-shot injection molding method which uses a rotating, double female die means selectively cooperating with two male dies. The finished keybutton array is ejected to a carrier which then cooperates with a gathering fixture, which fixture is then movably adjusted to place the keybuttons in position for assembly to the keyboard.

13 Claims, 17 Drawing Figures

TWO-SHOT INJECTION MOLDING

TECHNICAL FIELD

The present invention relates to two-shot injection molding of a plastic article such as a typewriter keybutton having two externally visible colors, one of which is the keybuttons's character indicia.

BACKGROUND OF THE INVENTION

The present invention relates to that type of two-shot injection molding wherein the first shot forms the keybutton's exterior surface or shell, including a void in the shape of the desired keybutton character. This is "shell-first" two-shot injection molding. U.S. Pat. Nos. 2,544,140 and 2,663,910 are exemplary.

The use of two male dies and one female die to form such a shell-first article is taught by, for example, U.S. Pat. Nos. 2,765,555 and 3,031,722. In these patents, the first shot forms the article's shell and character voids. The first male die is then withdrawn from the shell. The article's shell is held by the female die as a second, somewhat smaller, male die is mated therewith. The second shot now fills the inside of the article, i.e., molds the article's core as well as the character voids, with a different color material.

In U.S. Pat. No. 3,164,864 a keybutton is molded "core-first" by means of a single male die which is used with a first-shot female die. The first female die is then withdrawn, leaving the keybutton's core on the male die. This core includes the keybutton's character as a raised surface. The male die is now mated with a somewhat larger female die, and second-shot molding forms the keybutton's shell. This shell surrounds but does not cover the keybutton's raised character.

The use of rotary and/or movable mold dies to facilitate two-shot molding is also known in the prior art.

A first example is U.S. Pat. No. 3,173,176 where a rotary die-carrying mechanism produces two-color typewriter keys. In this device a plurality of upper dies carries the first-shot molding from the first-shot injector to a second-shot injector.

A second example is U.S. Pat. No. 3,178,497 where a reciprocating male die mechanism carries the first-shot-molding from a first female die, to a second female die, for second-shot-molding.

A third example is U.S. Pat. No. 4,165,959 where a rotary two-injector mechanism first injects into a shell-first mold. The mold then opens, holding the first shot in the mold cavity. A reciprocating mold plate now moves from a first to a second position, thus changing the mold from a first to a second cavity configuration. The mold closes, and the article's core is molded using the second injector.

SUMMARY OF THE INVENTION

As above mentioned, the present invention relates to shell-first injection molding of a two-material, or two-color article.

Figure 1:
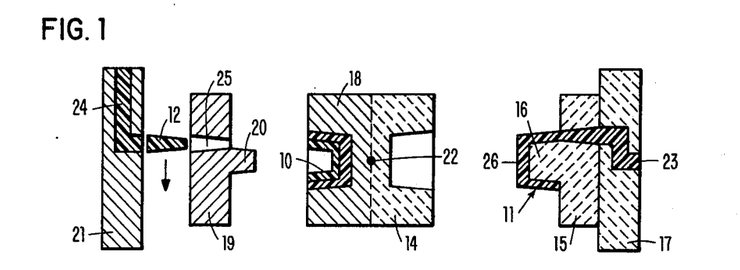
FIG. 1 shows the above-described start of the sequence of operation of the present invention, whereat the two molds are open, a finished article 10 is vacuum-held in the second female die 18 of the center-disposed, twin-female-die 14, 18, a molded shell 11 of the article is held on the first mold's male die 16, and the second mold's reciprocating mold plate 19 has withdrawn from its manifold mold plate 21, to thereby sever the second mold's sprue runner 12.

The present invention will be described using as an example a two-surface, or stack mold as seen in FIG. 1. Conventionally, mold members 17, 15, 14, 18, 19 and 21 (reading right to left in FIG. 1) would normally be called members A, B, C, D, E and F, respectively, of a single mold. However, in the following description, members 14, 15 and 17 will be called the "first mold", and members 18, 19 and 21 will be called the "second mold".

Figure 2:
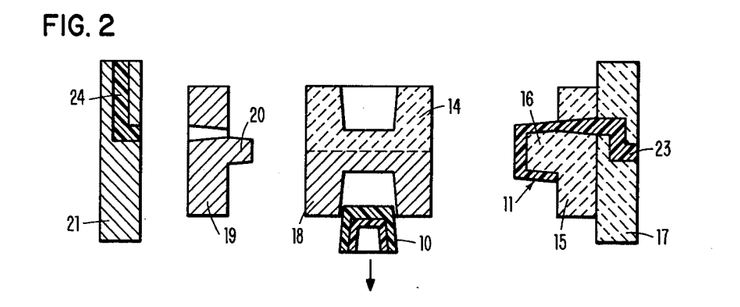
FIG. 2 shows the twin-female-die subsequently rotated counterclockwise (CCW) 90° such that the finished article 10 is now ejected vertically downward.
Figure 5:
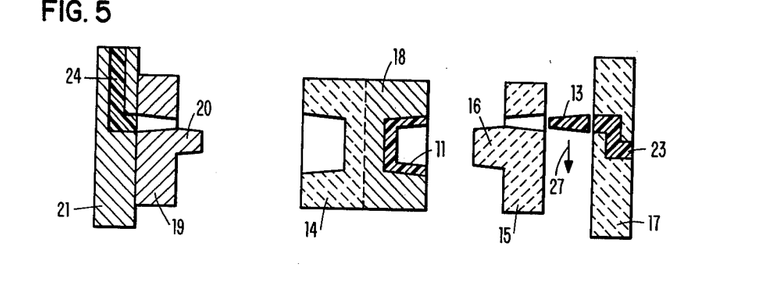
FIG. 5 shows the molds subsequently opened, with the first mold's reciprocating mold plate 15 withdrawn from its manifold plate 17, to thereby sever the first mold's sprue runner 13, and with the article's shell 11 now vacuum-held in the second mold's female die.
Figure 8:
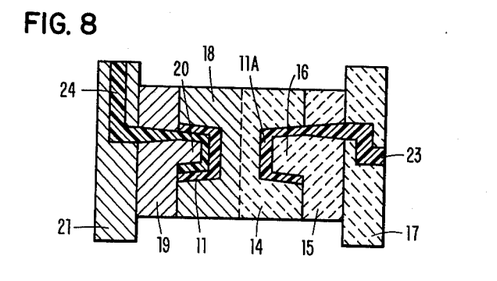
FIG. 8 shows the molds closed, whereat shell 11 is filled with a second molding material, and another shell 11a is formed in the female die 14 of the first mold; the sequence then returns to FIG. 1, and is repeated.

The novel features of the present invention include a construction and arrangement which automatically unloads the article's shell from a first-shot male die, severing the article's sprue runner, as the shell is loaded into a second-shot female die, where it is held by the force of vacuum (FIG. 5). The second-shot female die then transports the article's shell to a second-shot male die, for second-shot-molding of the article's core (FIG. 8). As the second-shot mold thereafter opens, the article's second-shot sprue runner is severed, and the finished article is held in the second-shot female die by force of vacuum (FIG. 1). The second-shot female die lastly moves to a discharge position to unload the finished article (FIG. 2).

More specifically, a center-disposed, rotatable, twin-female die means houses one female die for the keybutton's exterior shell, and a second female die for holding the keybutton's exterior shell as the keybutton's core is molded. In this manner, one keybutton shell is second-shot-molded, as the next keybutton's shell is simultaneously first-shot-molded (FIG. 8).

With this arrangement, the sequence of operation can be considered to begin as the two molds simultaneously open, leaving a finished keybutton vacuum-held in the second mold's female die, and leaving a molded keybutton shell on the first mold's male die (FIG. 1).

The twin-female-die means now rotates 90° (FIG. 2) (CCW, for example). In this position, the second female die holds the finished keybutton disposed vertically downward. The finished keybutton is now ejected. Both female dies are now empty.

Figure 3:
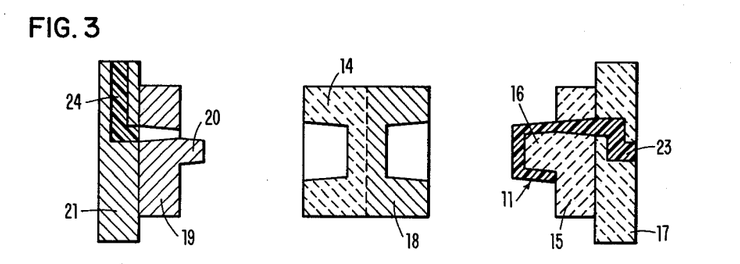
FIG. 3 shows the next position where the second mold's reciprocating mold plate has rejoined its manifold plate and the twin-female-die has rotated another 90° CCW.
Figure 4:
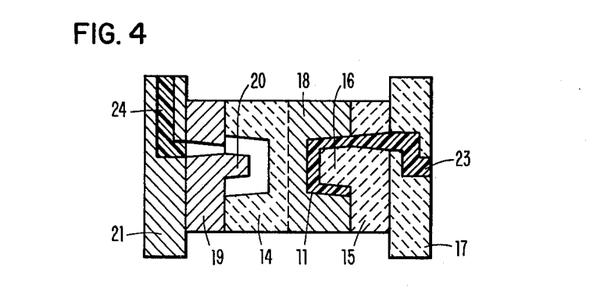
FIG. 4 shows the next position whereat the molds have closed with the female dies now mated with opposite-type male dies.

The twin-female-die means now rotates another 90° in the same direction (FIG. 3). Both molds then close, inserting the first male die into the second female die, and inserting the second male die into the first female die. The previously molded keybutton shell is thus loaded into the second female die (FIG. 4). Vacuum force is applied to hold the shell in the second female die, and the mold opens, severing the sprue runner (FIG. 5). Both male dies are now empty.

Figure 6:
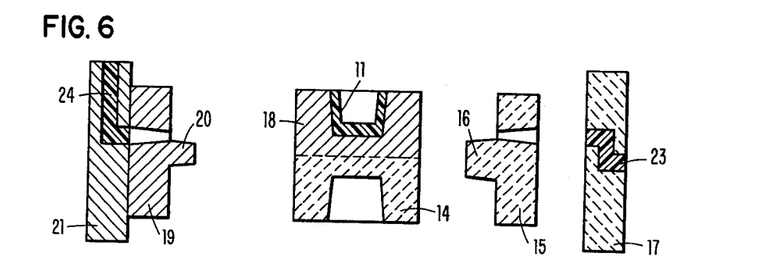
FIG. 6 shows the twin-female-die rotated another 90° CCW, at which time a photoelectric sensor, shown in FIG. 13, operates to detect the presence of shell 11.
Figure 14:
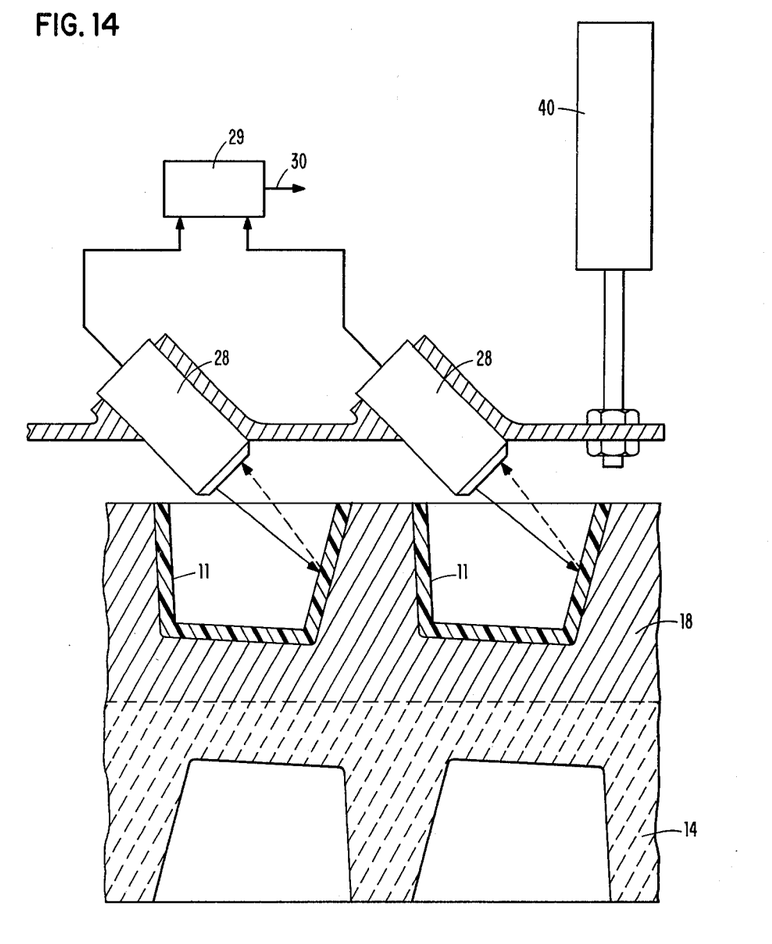
FIG. 14 shows two rows of a four-row, rotary, twin-female-die, in the position of FIG. 6, whereat photocell means operates to detect the presence of all 40 shells in the corresponding 40 female dies of the second female die.

The twin-female-die means now rotates another 90° (FIG. 6). Vacuum continues to hold the keybutton shell in the second female die, vertically disposed upward. A photoelectric sensor now operates to detect the presence of the keybutton shell in this female die (FIG. 14). If the shell is not properly detected, the process stops.

The twin-female-die now rotates another 90° (FIG. 7), the molds close, as the first male die is inserted into the first female die, and the second male die is inserted into the second female die (FIG. 8). The keybutton shell at the second female die is filled with a contrasting color, thus forming the keybutton's character in the contrasting color. At the same time, another keybutton shell is molded at the first female die.

The two molds now simultaneously open, completing one molding cycle (FIG. 1). Another finished keybutton now exists in the second female die, held there by vacuum force, the first female die is empty, and the first male die now holds the molded keybutton shell for the next keybutton to be manufactured.

Figure 10:
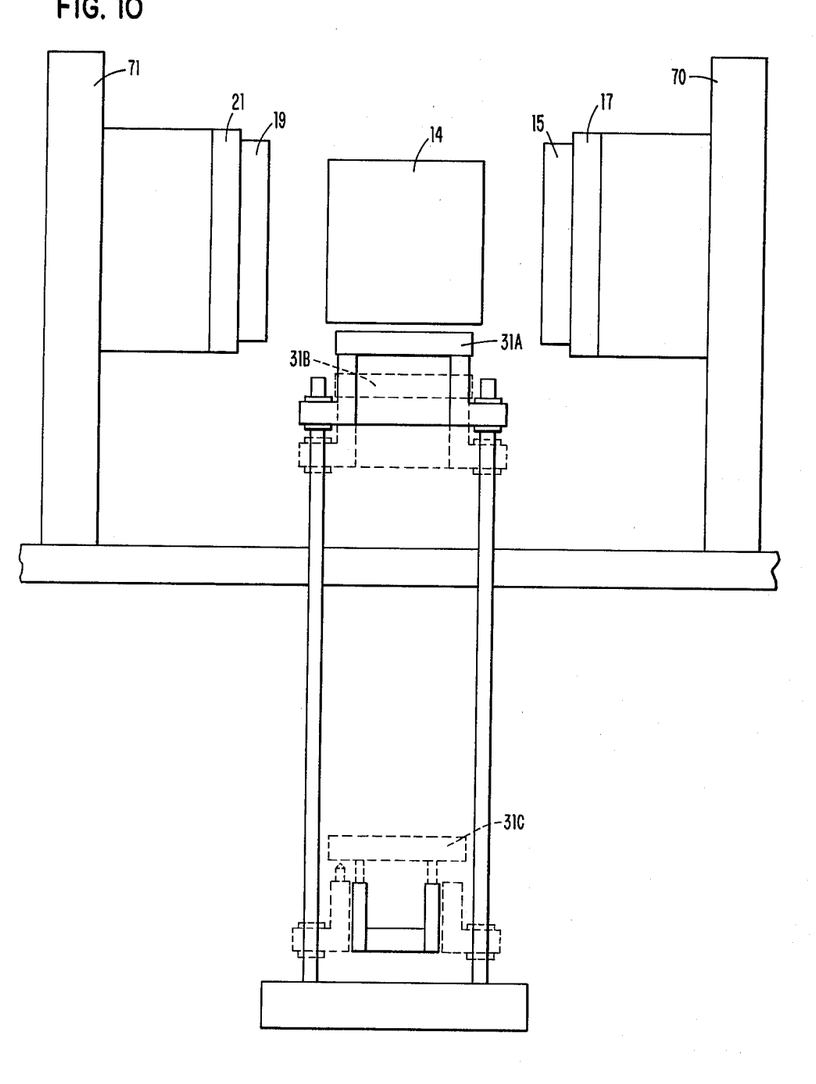
FIG. 10 shows the plate of FIG. 9 in its three separate operative positions 31a, 31b and 31c relative the mold.
Figure 11:
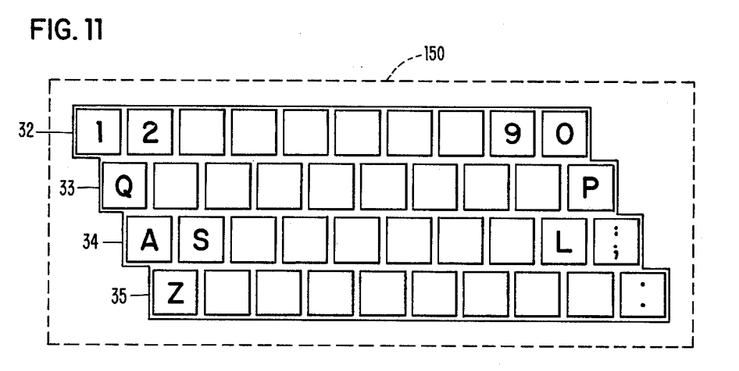
FIG. 11 shows the output result of the present invention, i.e., a tray 150 whose four rows of compartments hold a typewriter keybutton array with the buttons facing up.
Figure 12:
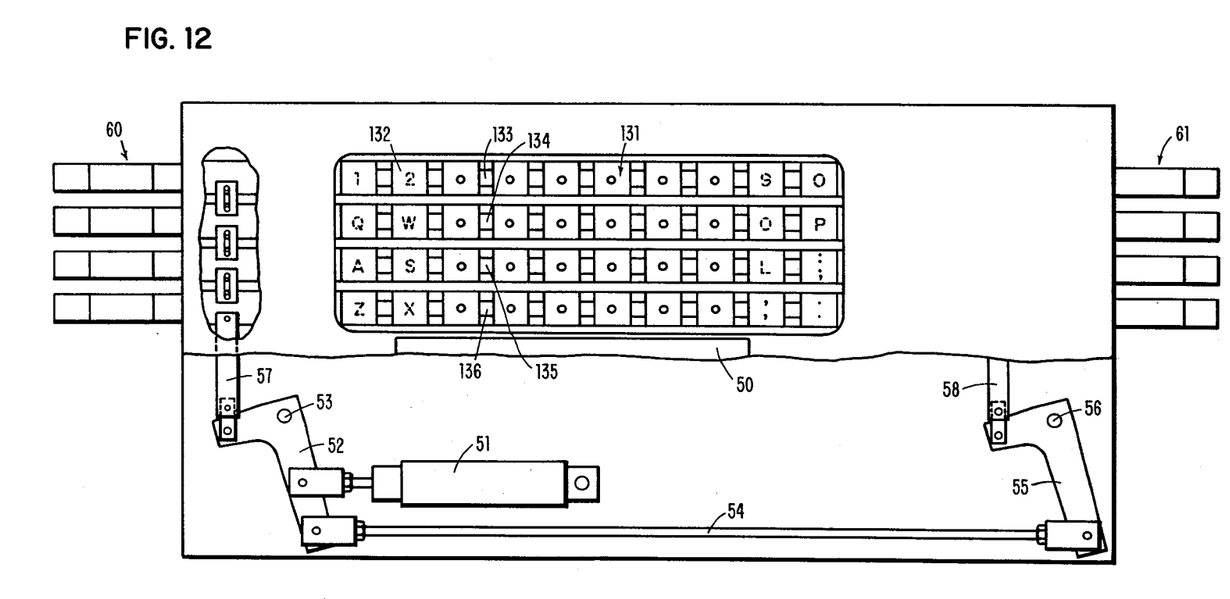
FIG. 12 shows a top view of the gathering fixture, with the top plate broken away to better show the row actuators, which actuators are operable to produce the keybutton configuration shown in FIG. 11.
Figure 13:
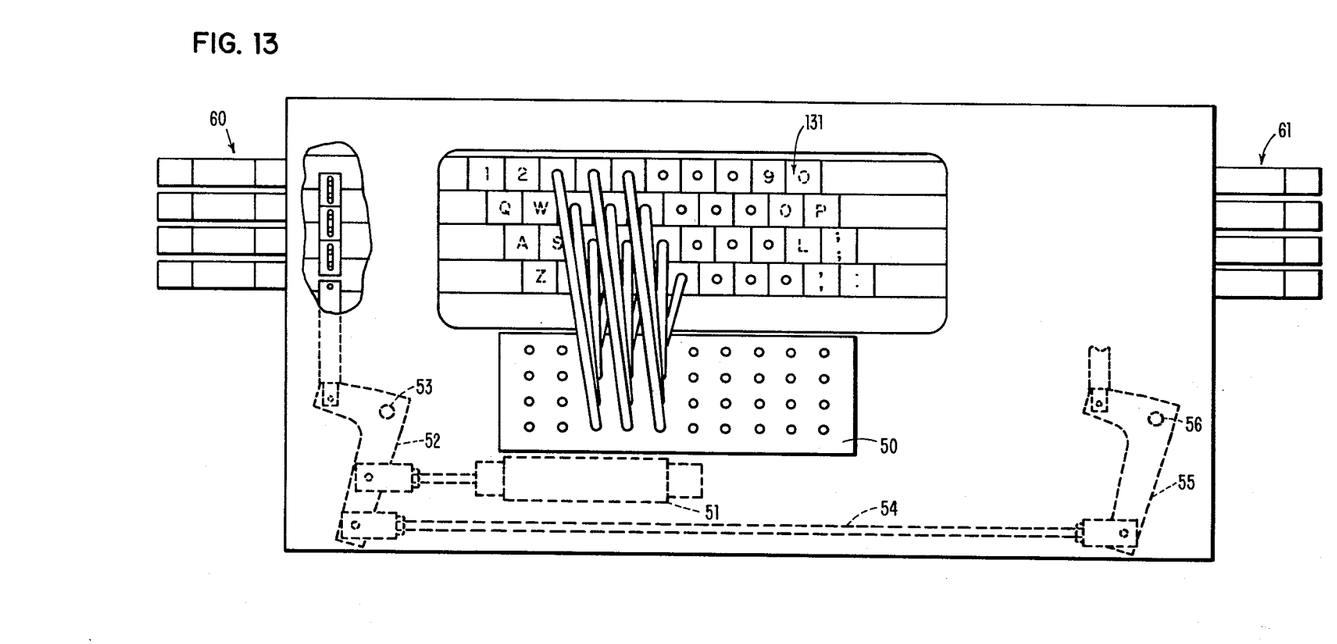
FIG. 13 is a top view of the gathering fixture, without the top plate broken away, showing the vacuum means which holds the keybuttons in position, against the force of gravity, and showing the keybutton positions adjusted to the FIG. 11 typewriter keybutton array position.
Figure 15:
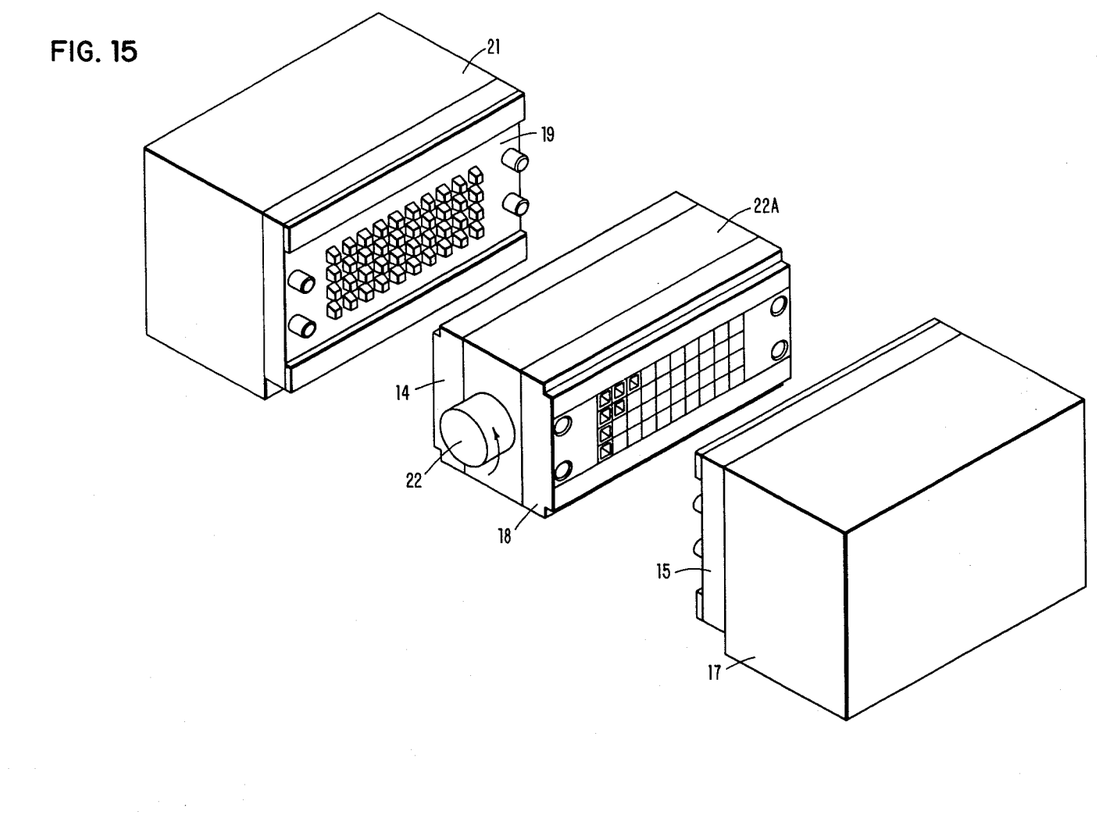
FIG. 15 is a perspective view of a multiple mold assembly, in the position of FIG. 3 whereby the plural individual keybuttons of an entire keyboard are molded in one cycle of the present invention.

Using the above concepts, the present invention additionally provides for the use of such a twin-female-die to mold all of the individual character keys of a typewriter keyboard by way of the aforesaid two-shot injection molding process (FIG. 15). As a result, all keys of such a keyboard simultaneously pass through the aforesaid process steps and are simultaneously ejected vertically downward onto a holding plate, where they are held by vacuum force (FIG. 10). This plate includes an array of shallow holding compartments, and may, for example, comprise an ordered array of ten columns and four rows of such compartments. In accordance with the present invention, this plate then delivers the array to a gathering fixture (FIGS. 12 and 13). The gathering fixture includes four similar rows of compartments which are relatively movable. The present invention causes subsequent movement of these compartments in a manner such that the molded keybuttons are placed in the exact staggered configuration well known to typists (FIG. 11). As such, the keybuttons are ready for assembly to a keyboard.

In describing the present invention, the details of injection molding machine, two-surface or stack molds, mold construction details, rotary molds, photocell details, and the like, will not be shown or described because they are known to those skilled in the art. As exemplary of this fact, the aforesaid prior patents are incorporated herein by reference for the purpose of indicating the background of the present invention, and as illustrative of the state of the art.

In the following drawing, the aforesaid two molds are sometimes shown in section. In order to aid in clarity, the molds are shown with different type section lines.

The foregoing and other features and advantages of the invention will be apparent from the following more particular description of preferred embodiments of the invention, as illustrated in the accompanying drawing.

DESCRIPTION OF THE PREFERRED EMBODIMENTS

The term "first mold" will include female die 14, manifold plate 17, and reciprocating mold plate 15 which carries male die 16. Likewise, the "second mold" will comprise female die 18, manifold plate 21, and reciprocating mold plate 19 which carries male die 20.

The two female dies 14, 18 are formed as a unitary assembly and rotate about an axis 22. These dies include an appropriate plate 22a (FIG. 15) therebetween, to facilitate the routing of vacuum lines and cooling water passages. As will be apparent, this rotation occurs in 90° steps, and in the counterclockwise (CCW) direction as shown in FIGS. 1–8.

For purposes of description only, the injection-molding material 23 is a gray-colored material, and the injection-molding material 24 is a white material.

It is convenient to describe the present invention by "stopping" the process in the condition shown in FIG. 1. In this condition, female die 14 is empty, and female die 18 holds a finished article, such as keybutton 10. Both molds are open and reciprocating mold plate 19 has moved away from manifold plate 21, thereby severing the white sprue runner 12 which just previously occupied sprue 25 in plate 19. In addition, shell 11 of a keybutton identical to keybutton 10 is now contained on the male die 16 of reciprocating mold plate 15.

Figure 16:
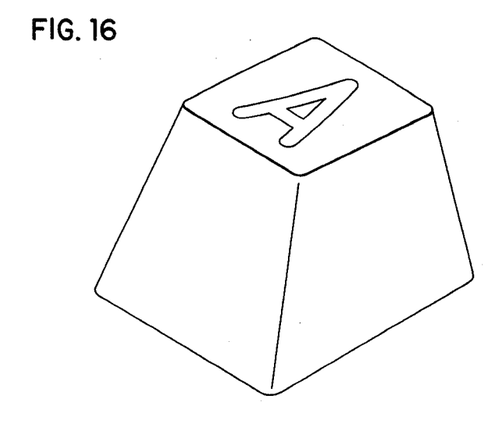
FIG. 16 is a face-up perspective view of an exemplary keybutton to be molded by the present invention.

As is well known to those of skill in the art, male die 16 and female die 14 are constructed and arranged such that shell 11 includes a character, such as the character "A" in its face 26, see FIG. 16. In addition, female die 18 is constructed and arranged to snugly hold the exterior surface of shell 11, without obstructing the void "A." Male die 20 is of the same general shape as male die 16.

However, die 20 is smaller in size such that material 24 may fill the interior cavity of shell 11, and flow into the void defining the character "A" thereby filling this void and providing a white character "A" which is surrounded by a gray shell. Finished keybutton 10 of FIG. 1 is such a keybutton.

For simplicity, the arrangement of FIGS. 1–8 shows the molding of a single keybutton. It is within the present invention to provide a plurality of some 40 unique keybuttons wherein the unitary assembly of first and second female dies 14 and 18 includes 40 distinctively different dies to form the conventional keyboard array as shown face-up in FIG. 11. In this case, 40 distinctly different male dies 16 and 20 are provided.

The next step of the present invention is shown in FIG. 2. Female die assembly 14, 18 has rotated 90° CCW and ejection means (not shown) ejects finished part 10 vertically downward into a gathering fixture to be described later. This ejection may be accomplished by terminating the second female die's vacuum-hold, or by changing it from a negative to a positive pressure.

In FIG. 3, the female dies have rotated another 90° CCW, both die cavities are empty, and mold plate 19 has rejoined manifold plate 21.

The molds now close, as shown in FIG. 4. The cavity formed by female die 14 and male die 20 is empty. Injection does not take place at this time. Rather, a vacuum force conduit, within second female die 18, is activated to provide a force holding shell 11 within this female die cavity. Therefore, when the molds again open, as shown in FIG. 5, shell 11 is retained in female die 18, as it is severed from sprue runner 13. Mold plate 15 withdraws from manifold plate 17, and runner 13 is ejected, as represented by arrow 27.

The twin-female-die assembly now rotates a further 90° CCW, to the position shown in FIG. 6. In this position it is desirable to check that each of the female die cavities 18 actually contains a shell 11. If a failure occurs, and a cavity if no occupied by a shell 11, subsequent injection molding of the white-color material 24 into an empty cavity will cause the molding material to enter the vacuum conduit, above-mentioned, thus fouling the conduit. Therefore, the process is terminated should a shell(s) not be detected.

FIG. 14 shows a twin-female-die assembly having some 80 cavities, 40 on each side, two of which are shown holding shells 11. Associated with each of the cavities of female die 18 is a light source/photoelectric cell couple 28 which is constructed and arranged to direct light to the interior surface of each of its shells 11. If a shell occupies a cavity, the light is not reflected back to a photoelectric cell and an electrical signal (for example zero volts) is generated to network 29. Should any of the cavities not contain a shell 11, light is reflected to its photocell, and a signal on conductor 30 operates to terminate the molding process to prevent fouling of the aforesaid vacuum force conduit.

By way of example, the detectors 28 of FIG. 14 may be the brand SCAN-A-MATIC S351G reflective scanner manufactured by SCAN-A-MATIC INC. These detectors are normally spaced away from the rotatable female die assembly, and are appropriately lowered into the FIG. 14 detecting position by operation of actuator 40, while all such detectors are supported on plate 41.

Figure 7:
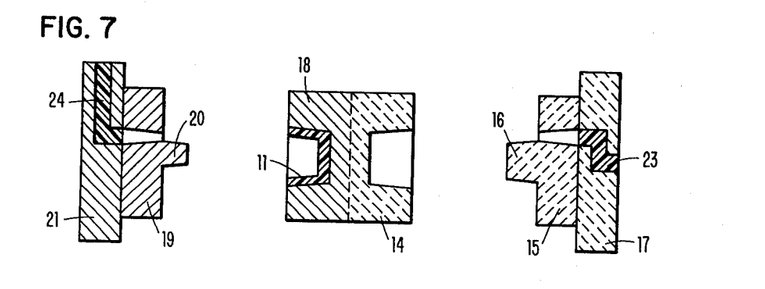
FIG. 7 shows a twin-female-die rotated another 90° CCW, and shows the first mold's reciprocating mold plate rejoined to its manifold plate.

If all female dies 18 properly hold a shell 11, the assembly 14, 18 again rotates 90° CCW, as shown in FIG. 7, and mold plate 15 rejoins manifold plate 17. The molds now close, as shown in FIG. 8.

Injection now takes place into both cavities. A second shell 14 is formed in the cavity defined by female die 14 and male die 15. The previously molded shell 11 is filled with material 24, as shell 11 resides in the cavity defined by female die 18 and male die 19.

In FIG. 8, injection simultaneously takes place in both cavities. White material 24 is injected in gray shell 11, and another gray shell 11A is molded in cavity 14, 16.

The process now returns to FIG. 1, as the dies open. A finished keybutton is contained within female die 18, and the keybutton shell 11A is contained on male die 16.

In this manner, the cyclic process continually repeats, and for every FIG. 1-to-8 cycle, a finished keybutton (an array of keybuttons) is formed by way of two-shot injection of two-colors.

Figure 9:
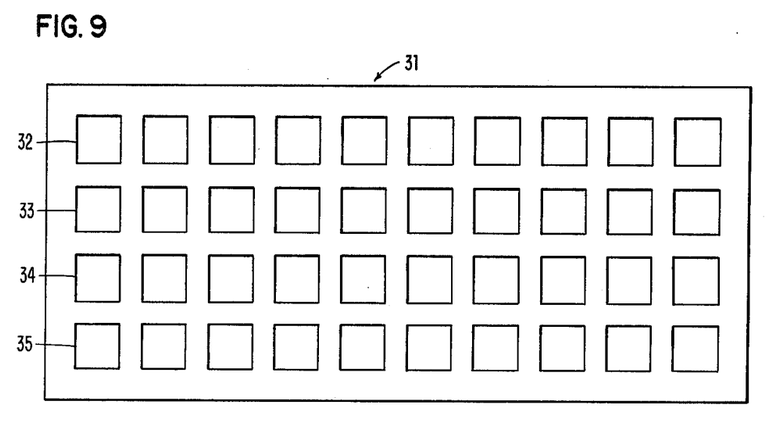
FIG. 9 is a top view of a plate which receives the array of molded keybuttons in a four-row configuration, as these finished parts are ejected, face up, in FIG. 2.

A further feature of the present invention provides a multicavity female-die assembly 14, 18 which, when disposed in its FIG. 2 position, ejects a number of finished different-character keybuttons, for example 40, onto a plate 31 whose top view is shown in FIG. 9. This plate comprises four rows 32–35, each of which contains 10 shallow, open-top compartments adapted to receive the distinctly different keybuttons of a well-known keyboard. These keybuttons reside on plate 31 face-up. A vacuum force may be used to hold each keybutton in its compartment. This 4×10 orderly array of compartments allows the female-die assembly 14, 18 to be constructed in a similar orderly manner.

FIG. 10 shows plate 31 in its three separate operative positions relative to the molding machine. Position 31b is the "wait position" where an empty plate awaits arrival of the FIG. 2 status of the molding operation. When the FIG. 2 status arrives, plate 31 moves up to position 31a, where keybuttons are ejected onto the plate from female die 18. After plate 31 is so loaded with a keybutton array, the tray is lowered to position 31c for unloading. At this time, plate 131 (FIGS. 12 and 13) moves over plate 31, as plate 31 resides in its position 31c, to remove the complete array by way of vacuum-pickup. Thereafter, the unloaded plate returns to position 31b.

In FIG. 10, mold members 15, 17 are shown supported on stationary platen 70, whereas mold members 19 and 21 are supported on movable platen 71.

The orderly array of keybuttons now held on plate 131, in FIG. 10's position 31c are now rearranged to the familiar keyboard position shown upright in FIGS. 11 and 13. In FIGS. 11 and 13, certain keybuttons carry their respective different indicia. As will be observed, this is the well-known typewriter keyboard.

The top-view, FIG. 12 position of the keybuttons is identical to the orderly array of plate 31 and female die 18. However, tray 131 comprises 40 slidable compartments 132 which are carried on row-slides 133, 134, 135 and 136, corresponding to FIG. 11's rows 32, 33, 34 and 35. Note that the keybuttons still face up. They have been lifted from plate 31, at FIG. 10's position 31C, and are held in position by FIG. 13's vacuum plenum 50, against the force of gravity. The top plate has been broken away in FIG. 12, and as a result, FIG. 13's vacuum plenum 50 is not seen in FIG. 12.

The operation of the mechanism shown in FIGS. 12 and 13 first moves the rows 133–136 together, as shown in the top view of FIG. 13, and then moves the rows laterally, as is also shown in FIG. 13. FIG. 13 also discloses a vacuum plenum 50 which is associated with the individual compartments 132 of tray 131 so as to hold each of the keybuttons securely in its respective compartment. In FIG. 12, tray 131 is shown with its compartments 132 in positions identical to FIG. 9. In order to move the four rows of tray 131 together, air cylinder 51 is energized. Crank 52 pivots about pivot point 53, as tie rod 54 transmits a similar motion to link 55 which pivots about pivot point 56. As a result, slides 57 and 58 move to bring the horizontal rows together.

Now that the rows have been brought together, two banks of air cylinders 60 and 61 are energized to move the rows to their staggered position, shown in FIGS. 11 and 13.

Tray 131, in its FIG. 13 position, is now mated with an output tray such as represented by outline 150 of FIG. 11. The vacuum force of plenum 50 is released, and the keybuttons gravity-drop onto and into tray 150. This last tray 150 now holds the keyboard array, ready to be assembled to a keyboard.

From the foregoing description it is apparent that the present invention uses a three-plate, self-degating mold design. The keybuttons's outer shell 11 is molded first. This first-shot shell is then auomatically transferred to the second-shot male die 20 via the second-shot female die 18. This transportation is faciliated by the use of back-to-back, first and second shot female dies 14, 18 which are contained in a centrally mounted, rotating mold plate.

The finished keybuttons which make up a keyboard array are then automatically loaded onto an output tray 150 (FIG. 11), significantly lowering labor requirements at a subsequent keyboard assembly facility. Trays 150, which are rectangular in shape, can be packed for shipment to such a facility. Once received, the keybuttons are automatically removed from the trays and assembled to the keyboard.

As mentioned, FIG. 1–8's centrally disposed, rotating female die plate 14, 18 preferably includes as many as 40 distinctively different female die cavities 18. Generally speaking, female die cavities 14 are all of the same shape, since their only requirement is that they hold the keybutton shell, and not interfere with each shell's distinctively different character void.

Figure 17:
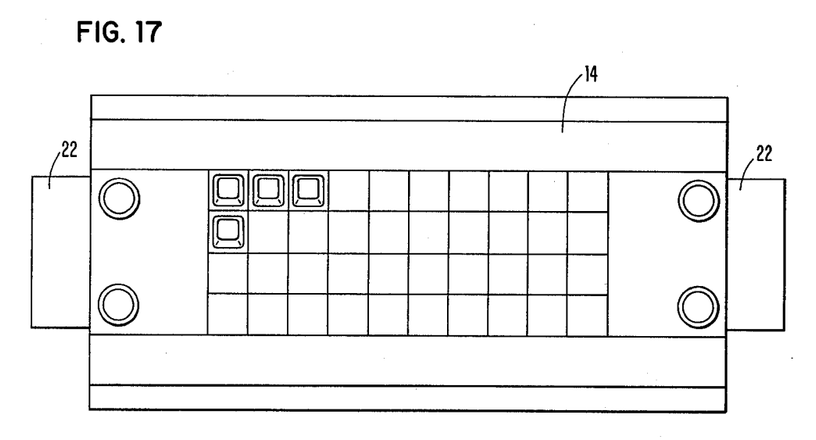
FIG. 17 is a plan view of FIG. 15's female die 14, showing a few of the die cavity outlines.

FIG. 15 shows such a multiple female-die assembly, and FIG. 17 shows one such female die 14.

An exemplary injection molding machine to be used in the practice of the present invention is the Hydraulic Clamp Machine X420 by Husky Injection Molding Systems, Ltd.

While the invention has been particularly shown and described with reference to preferred embodiments thereof, it will be understood by those skilled in the art that various changes in form and details may be made therein without departing from the spirit and scope of the invention:

What is claimed is:

1. A two-material injection molding method for forming a molded part whose outer surface comprises an image formed of material A, surrounded by a shell of material B, the method comprising the steps of:
   providing two female dies, said first female die providing the exterior shape of said molded part including a void defining said image, and said second female die accepting said part's exterior shape without obstructing said voids;
   mating said first female die with a first male die and injection molding said material B, to thereby form a material B shell of said molded part, including a void in the shape of said image;
   separating said first female die from said first male die, while leaving the material B shell of said molded part on said first male die;
   mating said second female die with said first male die while said first male die supports said material B shell;
   applying a force between said second female die and the part's material B shell to thereby retain the material B shell within said second female die, as said first male die is separated therefrom;
   mating said second female die with a second male die which is similar in size than said first male die, to thereby define a cavity between said second male die and the interior surface of said material B shell; and injection molding the cavity thus formed with material A, to thereby form a finished part.

2. The method of claim 1 including the additional step of separating said second female die from said second male die as the finished part is held in said second female die by operation of said applied force.

3. The method of claim 2 including the step of providing said first and second female dies as a unitary assembly which is rotatable between two positions whereat said first and second male dies are mounted, and including the additional step of providing said first as a vacuum force which extends through a conduit in said second female die.

4. The method of claim 3 including the step of mating said second female die with said second male die, and mating said first female die with said second male die, and thereafter substantially simultaneously molding a second material B shell of said molded part in said first female die, as the prior-molded material B shell in said second female die is interior-filled with material A.

5. The method of claims 1, 2, 3 or 4 wherein said materials A and B are of different colors, wherein said molded part is a keybutton and wherein said image is a keybutton character.

6. The method of claims 1, 2, 3 or 4 wherein the injection into said first and second female dies is effected through a sprue formed in a reciprocating mold plate, and including the step of effective movement of said mold plates to sever the material B sprue runner for said shell, and to sever the material A sprue runner for said finished part.

7. A two-material injection molding method for forming a plurality of different character keybuttons making up at least a portion of the keyboard array, each keybutton's outer surface comprises a different character image formed of one color, surrounded by a shell of another color, the method comprising the steps of:
   providing a unitary assembly of two female die groups, said first female die group having said plurality of individual female dies which provide the exterior shape of the plurality of keybuttons and include a void defining said different characters, and said second female die group having a corresponding plurality of individual female dies which accept said exterior shape without obstructing said voids;
   mating said first female die group with a first male die group and injection molding said one color to thereby form a said one-color shell of all of said plurality of keybuttons, each of which includes a void in the shape of that keybutton's character;
   separating said first female die group from said first male die group, while leaving said shells of said plurality of keybuttons on said first male die group;

mating said second female die group with said first male die group while said first male die group supports said shells of said plurality of keybuttons;

applying a force between said second female die group and the shells of said plurality of keybuttons, to thereby retain said shells within said second female die group as said first male die group is separated therefrom;

mating said second female die group with a second male die group which is of a smaller size than said first male die group, to thereby define a plurality of cavities between said second male die group and the interior surface of said each of said shells; and injection molding the plurality of cavities thus formed with material of said another color.

8. The method of claim 7 including the additional step of separating said second female die group from said second male die group as the finished keybuttons are held in said second female die group by operation of said applied force.

9. The method of claim 8 including the step of rotating said unitary assembly between two positions whereat said first and second male die groups are mounted, and including the additional step of providing said force as a vacuum force which extends through a plurality of conduits in said second female die group.

10. The method of claim 9 including the step of mating said second female die group with said second male die group, and mating said first female die group with said second male die group, and thereafter substantially simultaneously molding a plurality of keybutton shells in said first female die group, as the prior-molded plurality of keybutton shells in said second female die group is interior-filled with said another color material.

11. The method of claim 10 including the next subsequent steps of positioning said second female die group generally vertically downward, and ejecting said plurality of finished keybuttons into a carrier, and then transferring said keybuttons to a tray having movable keybutton cavities.

12. The method of claim 11 including the next subsequent step of moving said keybutton cavities into the configuration of a keyboard.

13. The method of claims 7, 8, 9 or 10 wherein the injection into said first and second female die groups is effected through sprues which are formed in a reciprocating mold plate, and including the step of effecting movement of said mold plates to sever the one-color and the another-color sprue runner from the keybutton shells and from the finished keybuttons, respectively.

* * * * *